United States Patent
Misek

(10) Patent No.: US 6,649,899 B2
(45) Date of Patent: Nov. 18, 2003

(54) SYSTEMS AND METHODS OF SAMPLING A PHOTODETECTOR AND PHOTOCELL CIRCUITS INCORPORATING THE SAME

(75) Inventor: Brian J. Misek, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 52 days.

(21) Appl. No.: 09/994,036

(22) Filed: Nov. 19, 2001

(65) Prior Publication Data

US 2003/0094565 A1 May 22, 2003

(51) Int. Cl.[7] ............................................... H01J 40/14
(52) U.S. Cl. ............................. 250/214 R; 250/214.1; 250/208.1
(58) Field of Search ..................... 250/214 R, 214.1, 250/214 A, 214 LA, 214 C, 208.1; 356/5.01, 5.05, 218–226; 327/514; 348/315, 320–324

(56) References Cited

U.S. PATENT DOCUMENTS

| | | | |
|---|---|---|---|
| 3,968,480 A | * | 7/1976 | Stein ........................... 365/202 |
| 5,769,384 A | | 6/1998 | Baumgartner et al. |
| 6,037,643 A | | 3/2000 | Knee |
| 6,452,666 B1 | * | 9/2002 | Barna et al. ................ 356/5.01 |

* cited by examiner

Primary Examiner—Que T. Le

(57) ABSTRACT

Sampling systems and methods that enable a photodetector to be sampled and read concurrently are described. This scheme may be used to implement a photocell in which image data from the photodetector may be collected during readout. In this way, the substantial non-integration periods that often characterize sampling schemes in which the sampling and readout functions are performed sequentially, especially when operating in a shuttered, non-rolling imaging mode, may be avoided.

20 Claims, 3 Drawing Sheets

SYSTEMS AND METHODS OF SAMPLING A PHOTODETECTOR AND PHOTOCELL CIRCUITS INCORPORATING THE SAME

TECHNICAL FIELD

This invention relates to systems and methods of sampling a photodetector and to photocell circuits incorporating the same.

BACKGROUND

Photodetectors may be used in a wide variety of applications, including imaging applications and optical navigation applications. Recently, photodetector circuits have been incorporated into optical navigation sensors that provide non-mechanical tracking engines for computer mice. The optical navigation sensors employ optical navigation technology that measures changes in position by optically acquiring sequential surface images (frames) and mathematically determining the direction and magnitude of movement. In order to produce a distortion-free image of the scanned surface, the path of the scanning device across the surface should be determined with a high accuracy so that the original image may be mapped faithfully to the scanned pixel data. Such optical navigation systems typically track the scanned path based on detected pixel-to-pixel surface reflectivity differences. These changes in reflectivity may be quite small depending upon the surface medium (e.g., on the order of 6% for white paper). On the other hand, noise signals (e.g., shot noise signals produced by the photodiode), which are amplified by phototransister action, may be relatively large. The photoelement signals in optical navigation sensor applications, therefore, typically are characterized by relatively low signal-to-noise ratios. Consequently, optical navigation sensors typically include circuits that maintain the photoelement signal-to-noise ratios sufficiently high for sensor movement to be tracked. These circuits, however, should be relatively small in size so that a substantial portion of the photocell area may be used for light detection.

Some navigation sensors that have been proposed include two-dimensional photoelement arrays formed on an integrated circuit substrate that includes readout and signal processing circuitry. The photoelement arrays each may have multiple columns and multiple rows of photoelements. Each photoelement may include a phototransistor for generating current in response to detected light signals, servo amplifier circuitry for biasing the base of the phototransistor, and an integration capacitor for storing a charge that is responsive to the amount of photogenerated current. The integrated charge on the capacitor is periodically read and processed so that the amount of light falling on the photoelement during a given reading period may be determined.

SUMMARY

The invention features a scheme (systems and methods) for sampling a photodetector that enables the photodetector to be sampled and read concurrently. Thus, the invention may be used to implement a photocell in which image data from the photodetector may be collected during readout. In this way, the invention avoids the substantial non-integration periods that often characterize sampling schemes in which the sampling and readout functions are performed sequentially, especially when operating in a shuttered, non-rolling imaging mode.

In one aspect, the invention features a circuit for sampling a photodetector output node that comprises a multi-integrator circuit. The multi-integrator circuit is coupled between the photodetector output node and a readout node. The multi-integrator circuit comprises multiple storage elements and a control circuit. The control circuit is operable to present at the readout node a first stored sampling of the photodetector output node while concurrently storing a second sampling of the photodetector output node.

Embodiments of the invention may include one or more of the following features.

The multi-integrator circuit preferably comprises multiple integrator circuits. Each integrator circuit may comprise an associated storage node, a respective integration switch coupled between the associated storage node and the photodetector output node, and a respective readout switch coupled between the associated storage node and the readout node.

Control nodes of each of the integration switches may be coupled to a respective input control line. Control nodes of each of the readout switches also may be coupled to a respective readout control line.

In one embodiment, the integration switches and the readout switches of a pair of integrator circuits are cross-coupled so that a respective pair of input control lines control storage of a photodetector output node sampling at one storage node and concurrent presentation of a stored photodetector output node sampling from another storage node. In this embodiment, an output switch may be coupled between the readout node and each of the readout switches. The output switch may have a control node coupled to a readout control line.

In some embodiments, a shutter circuit may be coupled between the integration switches and the photodetector output node. The shutter circuit may comprise a switch that is coupled between the integration switches and has a control node coupled to an integration control line.

In some embodiments, the storage nodes may be operable to be discharged through the photodetector output node. In these embodiments, the storage nodes may be operable to be charged through the readout node.

In another aspect, the invention features a method of sampling a photodetector output node. In accordance with this inventive method, a first stored sampling of the photodetector output node is presented at a readout node while a second sampling of the photodetector output node is concurrently stored.

In another aspect, the invention features a photocell circuit, comprising a photodetector circuit and a multi-integrator circuit. The photodetector circuit has an output node. The multi-integrator circuit is coupled between the photodetector output node and a readout node. The multi-integrator circuit comprises multiple storage elements and a control circuit. The control circuit is operable to present at the readout node a first stored sampling of the photodetector output node while concurrently storing a second sampling of the photodetector output node.

In some embodiments in accordance with this aspect of the invention, the photocell circuit further comprises a plurality of photoelements that are arranged into an array. Each of the photoelements includes a respective photodetector circuit and an associated multi-integrator circuit.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
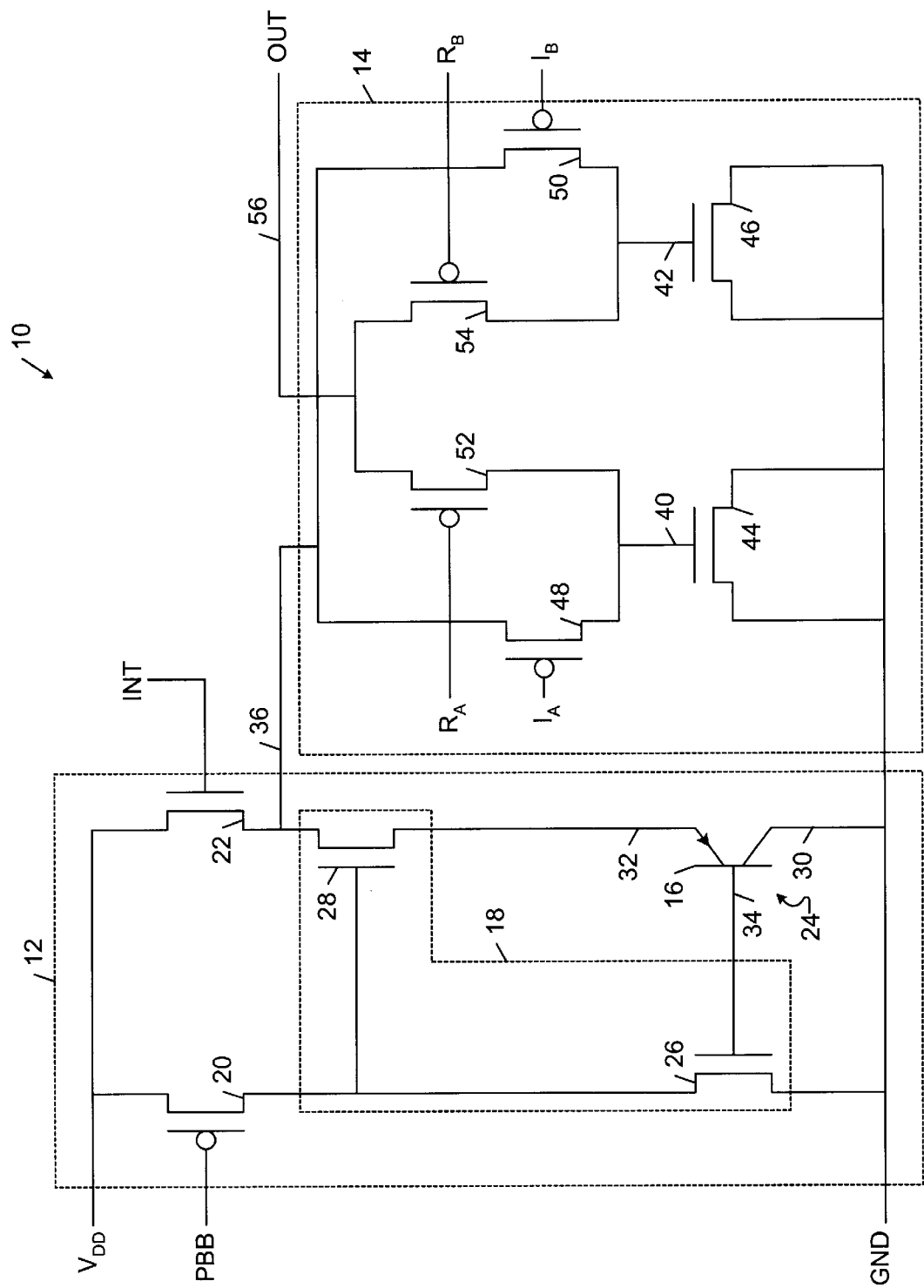
FIG. 1 is a circuit diagram of a first photocell circuit.

Referring to FIG. 1, in one embodiment, a photocell circuit 10 includes a photodetector circuit 12 and a multi-integrator circuit 14. In general, photodetector circuit 12 is operable to selectively draw through an output node current that corresponds to the amount of light received by a phototransistor. As explained in detail below, multi-integrator circuit 14 is operable to present at a readout node a first stored sampling of the photodetector output node while concurrently storing a second sampling of the photodetector output node.

Photodetector circuit 12 includes a phototransistor 16, a servo circuit 18, an input transistor 20, and an output transistor 22. Phototransistor 16 is a PNP transistor that generates current in response to received photons 24. Servo circuit 18 includes a pair of MOS transistors 26, 28 that form a bias point amplifier with a common gate stage for the output of phototransistor 16. Input transistor is a MOS transistor that selectively gates the supply of bias current from power line $V_{DD}$ in response to an input control signal (PBB). In general, servo circuit 18 and input transistor 20 fix the bias current at a substantially constant level that, in turn, sets the base-collector voltage of phototransistor 16. The base-collector voltage of phototransistor 16 preferably is set to a level that is approximately equal to the NMOS threshold level above GND at the collector node 30. Servo circuit 18 and input transistor 20 provide a negative feedback loop in which MOS transistor 28 operates as a source follower to the emitter node 32 of phototransistor 16. In this way, the base-collector voltage of phototransistor 16 is controlled by the emitter voltage of phototransistor 16. From the output perspective, transistor 28 of servo circuit 18 appears as a common gate stage that also isolates emitter node 32 and base node 34 of phototransistor 16 from the voltage swing at the output node 36 of photodetector circuit 12. Output transistor 22 is a MOS transistor that controls whether current from power line $V_{DD}$ will be available to supply the photogenerated current that is drawn by phototransistor 16. In particular, when output control signal INT is low, output transistor 22 is turned off, which prevents current from being supplied by power line $V_{DD}$. When output control signal INT is high, output transistor 22 is turned on, which allows current to be supplied by power line $V_{DD}$.

Multi-integrator circuit 14 includes a pair of storage nodes 40, 42, which correspond to the input gates of a pair of MOS transistors 44, 46, respectively. Multi-integrator circuit 14 also includes a pair of integration MOS transistors (or switches) 48, 50 and a pair of readout MOS transistors (or switches) 52, 54 that are respectively associated with storage nodes 40, 42. The gates of integration transistors 48, 50 are coupled respectively to control lines $I_A$ and $I_B$, and the gates of readout transistors 52, 54 are coupled respectively to control lines $R_A$ and $R_B$. The drains of readout transistors 52, 54 are coupled at a common output node 56 (OUT).

The input control signals $I_A$, $I_B$, $R_A$, $R_B$ and INT may be used to place the storage nodes 40, 42 of photocell circuit 10 into one of three operating modes: Hold, Integrate, and Conversion (or Readout). A storage node is placed in the Hold mode when the integration and readout switches 48–54 are open and the photodetector output switch 22 is closed (i.e., $I_A$, $I_B$, $R_A$, $R_B$ and INT are high). In the hold mode of operation, the charges on the storage nodes 40, 42 are isolated and held. A storage node is placed in the Integrate mode when one of the integration switches is closed and the photodetector output switch 22 is open (i.e., $I_A$ or $I_B$ is low, and INT is low). In the Integrate mode of operation, the photogenerated current that is drawn by phototransistor 16 is supplied by the charge stored at the storage node coupled to the closed integration switch. At the end of the Integrate mode, photocell circuit 10 is placed into the Hold mode. A storage node is placed in the Conversion mode of operation, when one of the readout switches 52, 54 is closed (i.e., $R_A$ or $R_B$ is low). In the Conversion mode of operation, charge is supplied by a reset power line to the storage node coupled to the closed readout switch. The charge that is required to set the storage node voltage to the reset power line voltage ($V_{RESET}$) corresponds to the amount of current drawn by phototransistor 16 during the integration period and is converted into a digital word by a readout circuit (not shown).

In operation, the storage nodes 40, 42 are initialized by placing each of them into the Conversion mode and then the Hold mode. Next, a first one of the storage nodes is placed into the Integrate mode and then the Hold mode. While the readout circuit is processing the first storage node, the second of the storage nodes is placed into the Integrate mode and then the Hold mode. In this way, storage nodes 40, 42 may operate concurrently so that image data from the photodetector circuit 12 may be collected during readout. This feature avoids the substantial non-integration periods that often characterize sampling schemes in which the integration and readout (or conversion) functions are performed sequentially, especially when operating in a shuttered, non-rolling imaging mode.

Figure 2:
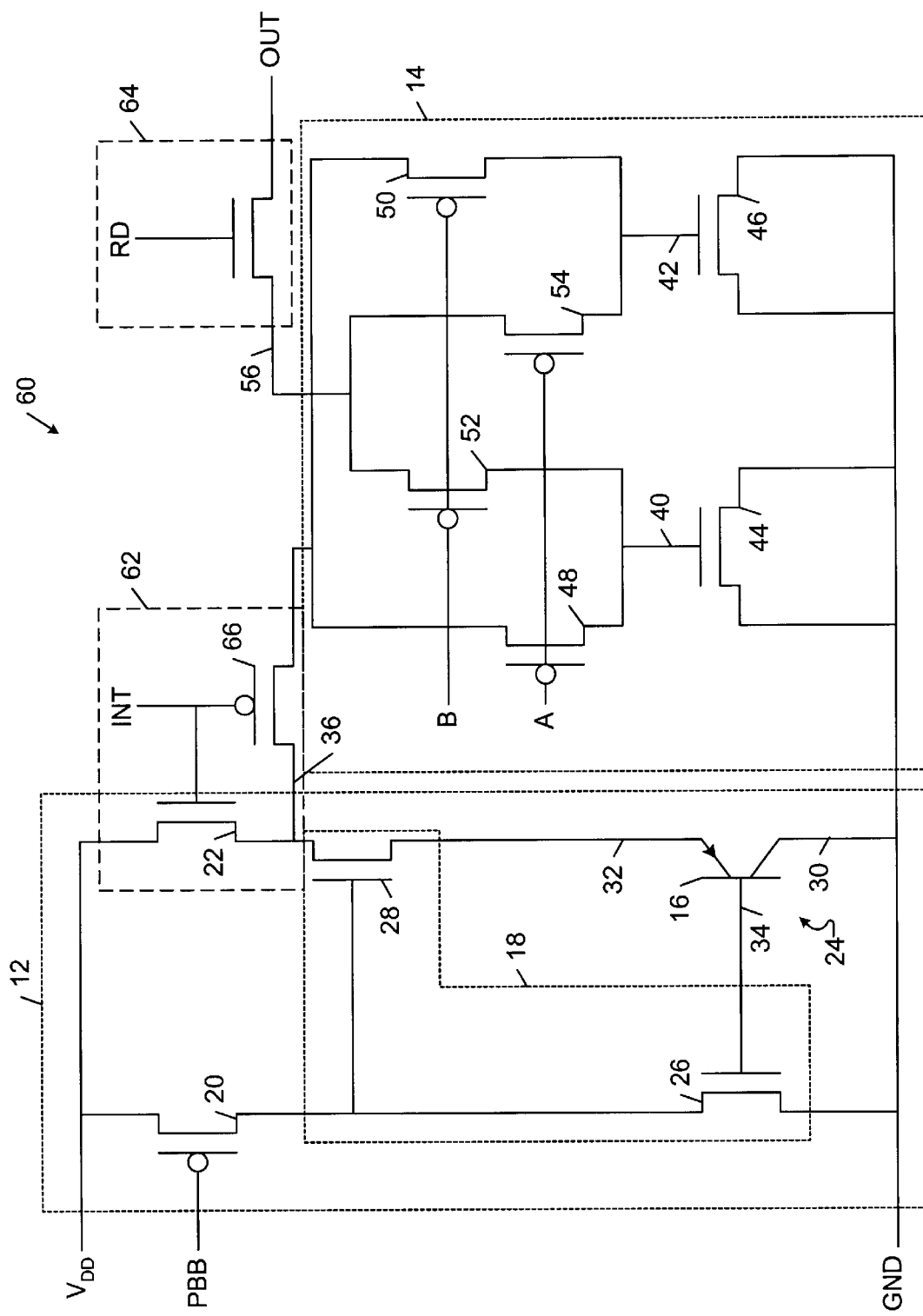
FIG. 2 is a circuit diagram of a second photocell circuit.

Referring to FIG. 2, in another embodiment, a photocell circuit 60 includes a photodetector circuit 12, a multi-integrator circuit 14, a shutter circuit 62, and a output switch 64. The operations of photodetector circuit 12 and multi-integrator circuit 14 are the same as the corresponding circuits described in connection with photocell circuit 10 of FIG. 1. In this embodiment, however, the integration switches 48, 50 and the readout switches 52, 54 are cross-coupled so that a respective pair of input control lines A, B control storage of a photodetector output node sampling at one storage node and concurrent presentation of a stored photodetector output node sampling from the other storage node. In particular, the gates of integration transistor 48 and readout transistor 54 are coupled to a common control line (A), and the gates of integration transistor 50 and readout transistor 52 are coupled to a common control line (B). The output transistor 22 of photodetector circuit 12 cooperates with an isolation transistor 66 of shutter circuit 62 to provide a "shutter" function. In particular, when output control signal INT is low, output transistor 22 is turned off and isolation transistor 66 is turned on, which prevents current from being supplied by power line $V_{DD}$ and allows multi-integrator circuit 14 to sample output node 36. When output control signal INT is high, output transistor 22 is turned on and isolation transistor 66 is turned off, which allows current to be supplied by power line $V_{DD}$ and prevents multi-integrator circuit 14 from sampling output node 36. Multi-integrator output switch 64 selectively couples the output of multi-integrator circuit 14 to a readout circuit (not shown). In this embodiment, the number of input control lines is reduced from five ($I_A$, $I_B$, $R_A$, $R_B$ and INT) to four (A, B, RD and INT) relative to the embodiment of FIG. 1, thereby freeing up additional photocell real estate for light detection by phototransistor 16.

The input control signals A, B, RD and INT may be used to place the storage nodes 40, 42 of photocell circuit 60 into one of three operating modes: Hold, Integrate, and Conversion (or Readout). A storage node is placed in the Hold mode when the integration, readout switches 48–54 and the isolation switch 66 are open (i.e., A, B and INT are high). In the hold mode of operation, the charges on the storage nodes 40, 42 are isolated and held. A storage node is placed in the Integrate mode when one of the integration switches is closed, the isolation switch 66 is closed and the readout switch 64 is open (i.e., one of A or B is low, and INT and RD are low). In the Integrate mode of operation, the photogenerated current that is drawn by phototransistor 16 is supplied by the charge stored at the storage node coupled to the closed integration switch. At the end of the Integrate mode, photocell circuit 60 is placed into the Hold mode. A storage node is placed in the Conversion mode of operation, when one of the readout switches 52, 54 is closed and output switch 64 is closed (i.e., one of A or B is low, and RD is high). In the Conversion mode of operation, charge is supplied by a reset power line to the storage node coupled to the closed readout switch. The charge that is required to set the storage node voltage to the reset power line voltage ($V_{RESET}$) corresponds to the amount of current drawn by phototransistor 16 during the integration period and is converted into a digital word by a readout circuit (not shown).

In operation, the storage nodes 40, 42 are initialized by placing each of them into the Conversion mode and then the Hold mode. Next, a first one of the storage nodes is placed into the Integrate mode and then the Hold mode. While the readout circuit is processing the first storage node, the second of the storage nodes is placed into the Integrate mode and then the Hold mode. In this way, storage nodes 40, 42 may operate concurrently so that image data from the photodetector circuit 12 may be collected during readout. This feature avoids the substantial non-integration periods that often characterize sampling schemes in which the integration and readout (or conversion) functions are performed sequentially, especially when operating in a shuttered, non-rolling imaging mode.

Figure 3:
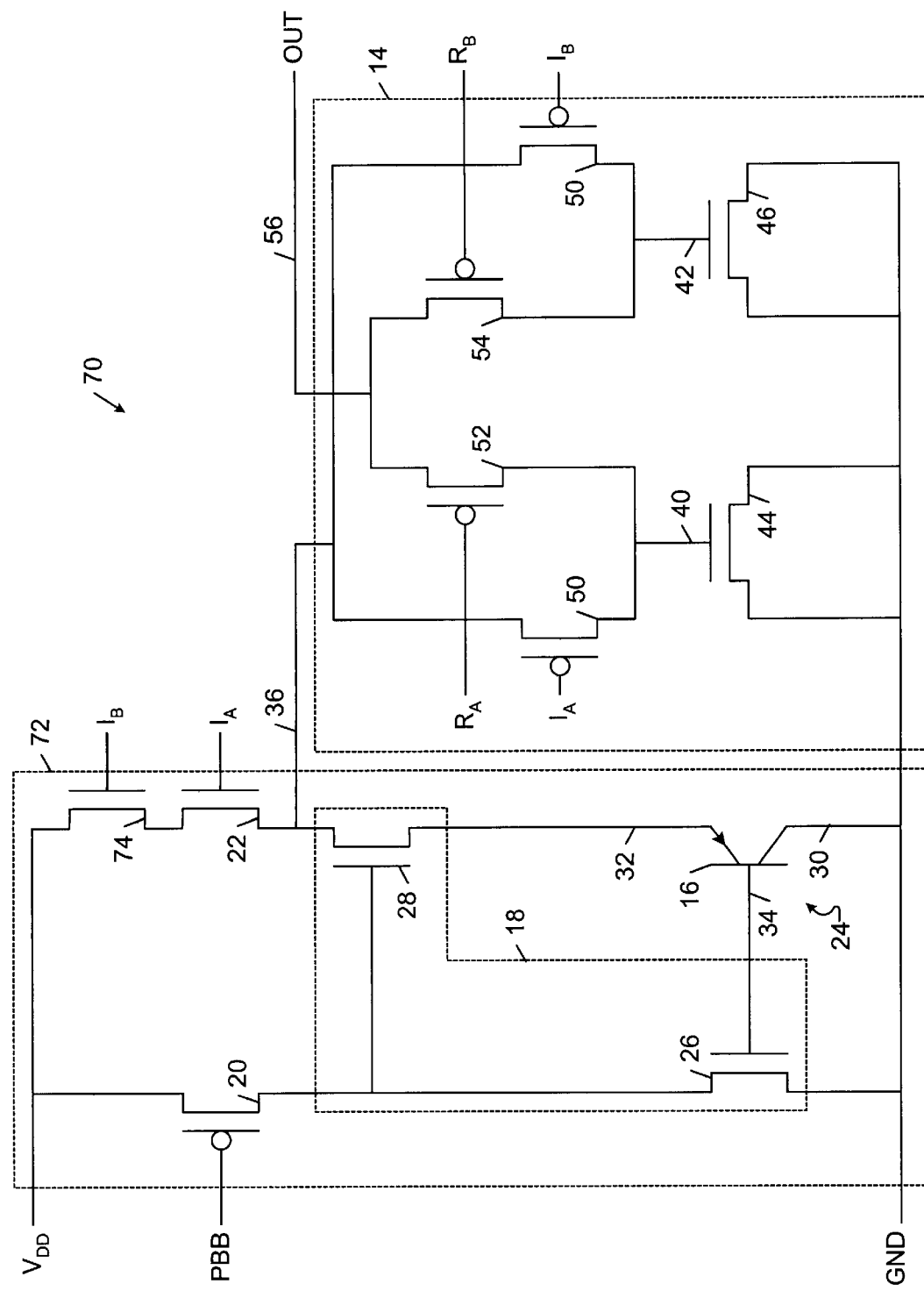
FIG. 3 is a circuit diagram of a third photocell circuit.

Referring to FIG. 3, in another embodiment, a photocell circuit 70 includes a multi-integrator circuit 14 and a modified photodetector circuit 72 that includes the same circuit elements as photodetector circuit 12 of FIG. 1, except photodetector circuit 72 includes an additional output transistor 74. In addition, the output transistors 22, 74 of photodetector circuit 72 are controlled by control lines $I_A$ and $I_B$, respectively. In this embodiment, the number of input control lines is reduced from five ($I_A$, $I_B$, $R_A$, $R_B$ and INT) to four ($I_A$, $I_B$, $R_A$ and $R_B$) relative to the embodiment of FIG. 1, thereby freeing up real estate for light detection by phototransistor 16.

The input control signals $I_A$, $I_B$, $R_A$ and $R_B$ may be used to place the storage nodes 40, 42 of photocell circuit 70 into one of three operating modes: Hold, Integrate, and Conversion (or Readout). A storage node is placed in the Hold mode when the integration and readout switches 48–54 are open and the photodetector output switches 22, 74 are closed (i.e., $I_A$, $I_B$, $R_A$ and $R_B$ are high). In the hold mode of operation, the charges on the storage nodes 40, 42 are isolated and held. A storage node is placed in the Integrate mode when one of the integration switches is closed and a corresponding one of the photodetector output switches 22, 74 are open (i.e., $I_A$ or $I_B$ is low, and $R_A$ or $R_B$ is high, respectively). In the Integrate mode of operation, the photogenerated current that is drawn by phototransistor 16 is supplied by the charge stored at the storage node coupled to the closed integration switch. At the end of the Integrate mode, photocell circuit 70 is placed into the Hold mode. A storage node is placed in the Conversion mode of operation, when one of the readout switches 52, 54 is closed (i.e., $R_A$ or $R_B$ is low). In the Conversion mode of operation, charge is supplied by a reset power line to the storage node that is coupled to the closed readout switch. The charge that is required to set the storage node voltage to the reset power line voltage ($V_{RESET}$) corresponds to the amount of current drawn by phototransistor 16 during the integration period and is converted into a digital word by a readout circuit (not shown).

In operation, the storage nodes 40, 42 are initialized by placing each of them into the Conversion mode and then the Hold mode. Next, a first one of the storage nodes is placed into the Integrate mode and then the Hold mode. While the readout circuit is processing the first storage node, the second of the storage nodes is placed into the Integrate mode and then the Hold mode. In this way, storage nodes 40, 42 may operate concurrently so that image data from the photodetector circuit 12 may be collected during readout. This feature avoids the substantial non-integration periods that often characterize sampling schemes in which the integration and readout (or conversion) functions are performed sequentially, especially when operating in a shuttered, non-rolling imaging mode.

Each of the above-described photocell circuits may be incorporated into an optical sensor array for a portable handheld scanning device or an optical computer mouse. For example, these embodiments may be incorporated into optical sensor arrays for one or more of the handheld scanning devices that are described in U.S. Pat. Nos. 6,037,643 and 5,769,384, each of which is incorporated herein by reference.

Other embodiments are within the scope of the claims.

For example, each of the multi-integrator circuits 14 has been described together with particular photodetector circuits 12, 72. In other embodiments, however, multi-integrator circuits 14 may be used to sample any one of a wide variety of different photodetector circuits, including a relatively simple photodiode circuit.

In other embodiments, one or more of the circuits described above may be flipped to provide the same respective functions with NMOS to PMOS duality and PNP to NPN duality, and VDD and GND duality. In addition, although the capacitive storage nodes in each of the above-described embodiments are implemented by NMOS devices, the storage nodes also may be implemented by linear capacitors, metal or poly in other embodiments.

Still other embodiments are within the scope of the claims.

What is claimed is:

1. A circuit for sampling a photodetector output node, comprising:
    a multi-integrator circuit coupled between the photodetector output node and a readout node and comprising multiple storage elements and a control circuit operable to present at the readout node a first stored sampling of the photodetector output node while concurrently storing a second sampling of the photodetector output node, wherein each storage element stores a charge that corresponds to the amount of current drawn by a photo-sensitive device in the photodetector during a given period.

2. The sampling circuit of claim 1, wherein the multi-integrator circuit comprises multiple integrator circuits each comprising an associated storage node, a respective integration switch coupled between the associated storage node and the photodetector output node, and a respective readout switch coupled between the associated storage node and the readout node.

3. The sampling circuit of claim 2, wherein control nodes of each of the integration switches are coupled to a respective input control line.

4. The sampling circuit of claim 3, wherein the integration switches and the readout switches of a pair of integrator circuits are cross-coupled so that a respective pair of input control lines control storage of a photodetector output node sampling at one storage node and concurrent presentation of a stored photodetector output node sampling from another storage node.

5. The sampling circuit of claim 4, further comprising an output switch coupled between the readout node and each of the readout switches and having a control node coupled to a readout control line.

6. The sampling circuit of claim 3, further comprising a shutter circuit coupled between the integration switches and the photodetector output node.

7. The sampling circuit of claim 6, wherein the shutter circuit comprises a switch coupled between the integration switches and having a control node coupled to an integration control line.

8. The sampling circuit of claim 3, wherein control nodes of each of the readout switches are coupled to a respective readout control line.

9. The sampling circuit of claim 1, wherein the storage nodes are operable to be discharged through the photodetector output node.

10. The sampling circuit of claim 9, wherein the storage nodes are operable to be charged through the readout node.

11. A method of sampling a photodetector output node, comprising:

presenting at a readout node a first stored sampling of the photodetector output node while concurrently storing a second sampling of the photodetector output node, wherein each stored sampling is a charge that corresponds to the amount of current drawn by a photo-sensitive device in the photodetector during a given period.

12. The sampling method of claim 1, wherein the first sampling of the photodetector output node is stored at a first storage node and the second sampling of the photodetector output node is stored at a second storage node.

13. A photocell circuit, comprising:

a photodetector circuit having an output node; and a multi-integrator circuit coupled between the photodetector output node and a readout node and comprising multiple storage elements and a control circuit operable to present at the readout node a first stored sampling of the photodetector output node while concurrently storing a second sampling of the photodetector output node, wherein each storage element stores a charge that corresponds to the amount of current drawn by a photo-sensitive device in the photodetector during a given period.

14. The photocell circuit of claim 13, wherein the multi-integrator circuit comprises multiple integrator circuits each comprising an associated storage node, a respective integration switch coupled between the associated storage node and the photodetector output node, and a respective readout switch coupled between the associated storage node and the readout node.

15. The photocell circuit of claim 13, wherein the integration switches and the readout switches of a pair of integrator circuits are cross-coupled so that a respective input control line controls storage of a photodetector output node sampling at one storage node and concurrent presentation of a stored photodetector output node sampling from another storage node.

16. The photocell circuit of claim 14, further comprising an output switch coupled between the readout node and each of the readout switches and having a control node coupled to a readout control line.

17. The photocell circuit of claim 14, further comprising a shutter circuit coupled between the integration switches and the photodetector output node.

18. The photocell circuit of claim 16, wherein the shutter circuit comprises a switch coupled between the integration switches and having a control node coupled to an integration control line.

19. The photocell circuit of claim 13, wherein control nodes of each of the readout switches are coupled to a respective readout control line.

20. The photocell circuit of claim 13, further comprising a plurality of photoelements arranged into an array, each photoelement including a respective photodetector circuit and an associated multi-integrator circuit.

* * * * *